Figure 1:
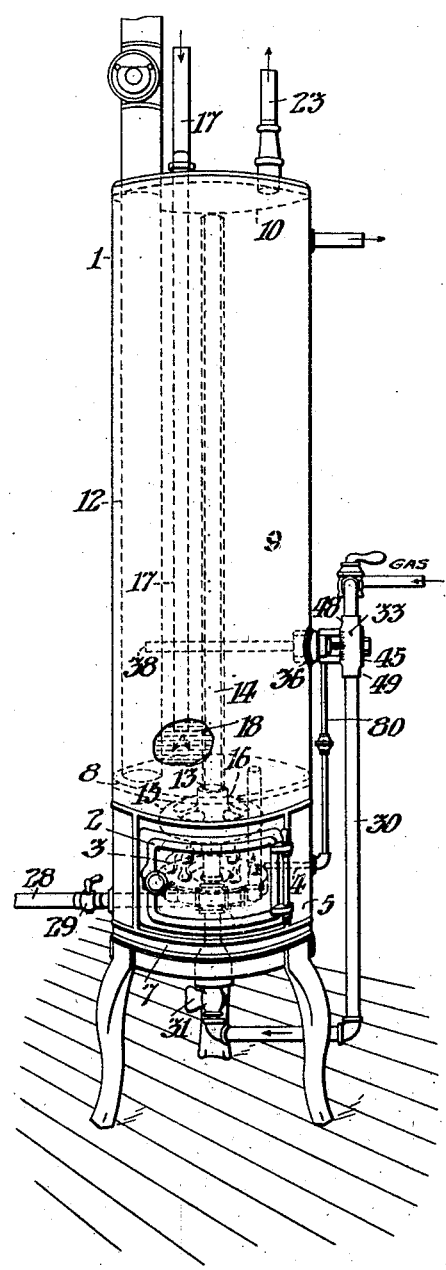

June 16, 1925.  1,542,573

A. E. PAIGE

THERMOSTATICALLY CONTROLLED VALVE

Filed Aug. 20, 1924    2 Sheets-Sheet 1

INVENTOR:
Arthur E. Paige

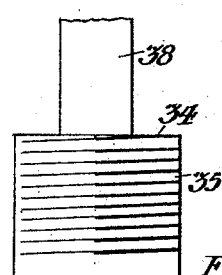
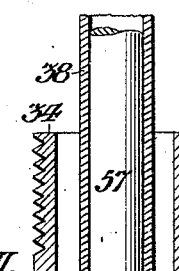
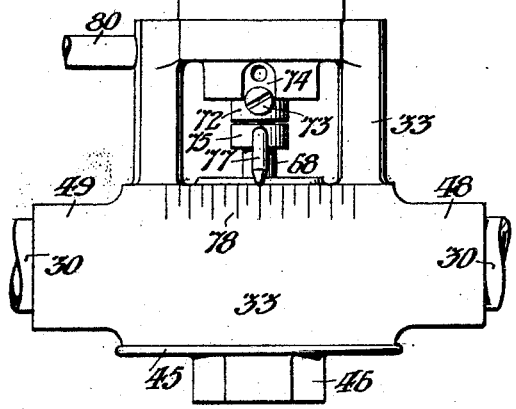
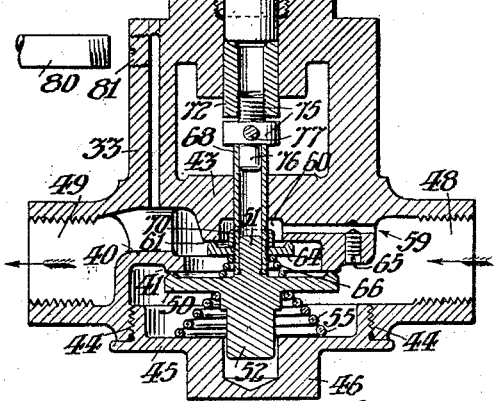
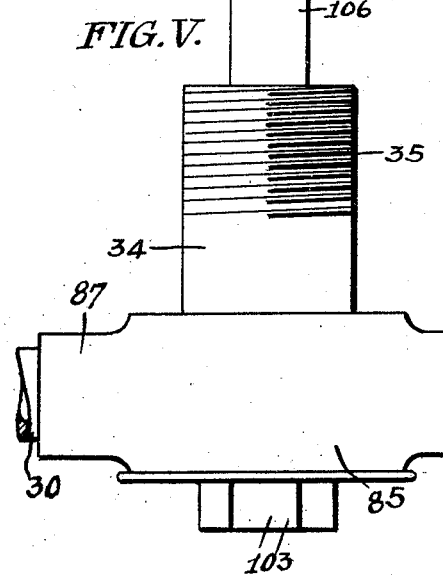
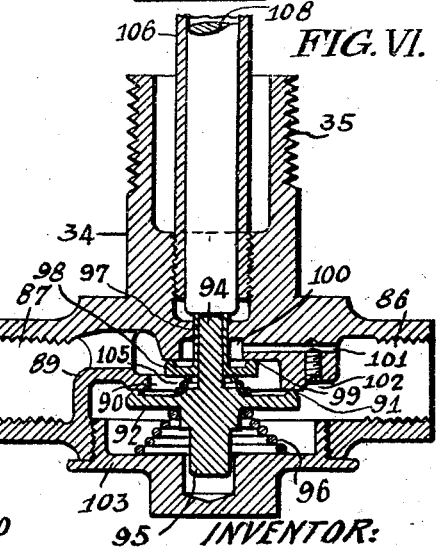

Patented June 16, 1925.

1,542,573

UNITED STATES PATENT OFFICE.

ARTHUR E. PAIGE, OF PHILADELPHIA, PENNSYLVANIA.

THERMOSTATICALLY-CONTROLLED VALVE.

Application filed August 20, 1924. Serial No. 733,067.

*To all whom it may concern:*

Be it known that I, ARTHUR E. PAIGE, a citizen of the United States, residing at Philadelphia, in the county of Philadelphia and State of Pennsylvania, have invented a certain new and useful Improvement in Thermostatically-Controlled Valves, whereof the following is a specification, reference being had to the accompanying drawings.

My invention is designed and adapted for use in connection with a gas water heater included in a house water supply system and comprising a container which is a hot water reservoir; with the object and effect of regulating the temperature of the water stored in said reservoir.

Only a small gas consumption is required to maintain a predetermined temperature of the stored water, until hot water is withdrawn therefrom and replaced by cold water, whereupon, a relatively large consumption of gas is required to quickly regain the loss of heat and restore the water to the predetermined temperature. Therefore, it is characteristic of my invention that means are provided to normally minutely regulate a small volume of gas passing to a burner in such heater and to temporarily permit the passage of a much larger volume of gas to the same burner. In other words, an object and effect of my invention is to provide both a coarse and a fine adjustment and regulation of the flow of gas to the same burner; although in the form of my invention herein disclosed, the burner includes a plurality of flame orifices.

As hereinafter described, my invention includes the combination with a water container; of a burner arranged to heat the water in said container; a main gas valve controlling a main fuel gas conduit leading to said burner; a bypass conduit leading to said burner around said main valve; an auxiliary valve controlling said bypass conduit; a spring arranged to normally close said main valve; a spring tending to close said auxiliary valve; a single thermostatic element, extending in said container, and in operative relation with both said valves, arranged to continually hold said auxiliary valve open, to a variable extent, and thereby vary the effective area of said bypass, in accordance with the temperature of the water in said container, and arranged to open said main valve at a predetermined temperature, and permit said main valve to be closed, by its spring, at a predetermined temperature; and means adjustable to variably determine the temperature at which said valves shall be respectively operated, in coordinated relation, by said thermostatic element; whereby the heating effect of said burner is automatically determined and controlled to regulate the temperature of the water in said container and compensate for fluctuations in such temperature consequent upon withdrawal of hot water and influx of cold water with respect to said container.

My invention includes the various novel features of construction and arrangement hereinafter more definitely specified.

In said drawings: Fig. I is a diagrammatic perspective view of a gas water heater embodying my improvements. Fig. II is a plan view of the thermostatically controlled fuel valve structure as indicated in Fig. I; showing the same in elevation. Fig. III is an axial sectional view of said valve structure. Fig. IV is a side elevation of the adjustable tubular metal plunger and its appurtenances indicated at the lower end of the thermostatic element in Figs. II and III. Figs. V and VI are respectively elevational and sectional views, similar to Figs. II and III, but showing a simpler modification of my invention.

Referring to Fig. I, the cylindrical tubular casing shell 1 has the door 2 in its circumference, affording access to the burners 3 and 4 mounted within the burner compartment 5 in said shell. Said burner compartment is formed by the skirt portion 7 of said shell extending below the partition 8 and including the opening for said door. Said partition 8 forms the bottom closure of the water container compartment 9 in said shell, which has the top closure 10. The flue pipe 12 for the escape of products of combustion from said burner 3 extends through said water compartment 9, parallel with the axis of said casing, but in eccentric relation thereto, and is conveniently rigidly connected with said closures 8 and 10 by welded joints. Said partition 8 has the axial screw threaded opening 13 for the hot water inlet pipe 14 extending upwardly from the water spreader 15, which is interposed between said burner 3 and said partition 8 and has the axial flange 16 provided with an external screw thread fitted in said opening 13. The pipe 17, which is rigidly connected with the top closure 10 of said water container 9, extends nearly to the bottom closure 8 of said container so as to supply the latter with cold water 18 from a municipal or other source.

Of course, any water heated in the structure above described is correspondingly expanded and tends to rise to the top of said container 9; while the relatively cold water 18 gravitates into said spreader 15 through the axial opening within said flange 16 and is distributed radially outward by a diaphragm in said spreader so that it reaches the bottom convex wall of said spreader at its outer circumference and gravitates thence downwardly toward the center of said spreader.

The construction and arrangement of said spreader 15 are such that the cold water thus flowing into said spreader at the perimeter thereof, is heated so as to rise in said axial hot water pipe 14 which extends nearly to the top of said container 9, so that hot water rising through said pipe 14 may be almost directly drawn off through the pipe 23 which leads to the dispensing faucets.

Of course, expansion of the water 18 within said spreader 15 causes precipitation of any solid matter which is normally suspended and carried in the water. Therefore, to enable the operator to eliminate any sediment deposited in the spreader, which would detract from its efficiency of operation, I provide the bottom of the spreader with the drain pipe 28 which has the stop cock 29 exterior to said casing 1, so that, by opening said stop cock, any sediment in the spreader may be rinsed out with the water thus drawn directly downward therethrough.

In the form of my invention indicated in Fig. I, the burner 3 is supplied with gas through the pipe 30, under manual control of the stop cock 31, but also under automatic control of the thermostatically operative fuel valve having the casing 33. Said casing 33 has the tubular extension 34 provided with the screw thread 35 detachably fitted in water-tight relation with the spud 36 in said heater shell 1; so that the thermostatic tube 38 extends horizontally in the water 18 in the container 9 but in tangential relation with a circle larger than the outside diameter of said pipe 14, so as to clear the latter.

Said valve casing 33 has the internal partition 40 with the circular main valve seat 41 thereon in coaxial relation with the plunger bearing 43 and the internally screw threaded seat 44 for the removable closure plug 45, which latter has the wrench hold 46 exterior to said casing. Said valve casing 33 also has the internally screw threaded pipe inlet seat 48 and pipe outlet seat 49 at respectively opposite sides thereof, leading from respectively opposite sides of said partition 40.

The main gas valve 50 is a disk fitted to said valve seat 41 and having two axial stems 51 and 52 projecting from respectively opposite sides thereof. Said valve stem 52 merely serves to engage the spiral spring 55 which is compressed between said plug 45 and said valve 50 and normally tends to close said valve upon its seat and thus shut off the gas supply to said burner 3.

Said main valve 50 is arranged to be automatically operated by the thermostatic couple including said tube 38, which is conveniently formed of copper, and the carbon rod 57 which is in contact with said tube 38 at its end remote from said valve casing 33, so that said rod 57 is moved axially toward said valve 50 by the contraction of said tube 38; the expansion and contraction of said rod being practically negligible within the range of temperatures to which said couple are subjected in the embodiment described. Ordinarily, it is desired to permit said main gas valve 50 to be closed by its spring 55 whenever the water 18 in the container 9 reaches 170° F., and to open said valve, automatically, by the operation of said thermostatic couple, whenever the temperature of said water falls below 170° F. That result might be attained by extending the stem 51 of said valve 50 so that it contacts with the adjacent end of said carbon rod 57 when the valve is in the closed position shown in Fig. III and the water at a temperature of 170° F., as any decrement in that temperature of the water would cause the copper tube 38 to contract and thrust said rod 57 against the valve stem 51 to open the valve. However, a device of that simple character is not commericially practicable, for the reason that the flame at the burner 3 would be extinguished every time said valve 50 closed, and unconsumed gas would be discharged through the burner whenever said valve 50 was thus automatically opened, unless the gas be manually lighted which, of course, would require the constant attendance of an operator. Therefore, attempts have been made to solve that difficulty by providing a bypass conduit around the main valve leading to what is termed a "pilot light," viz., a small burner 4, independent of the larger burner 3, but so located with respect thereto, that it serves to ignite gas discharged through said burner 3 whenever the main valve is opened. However, those double burner structures have been found objectionable, because no provision is made therein for automatically varying the volume of gas delivered to such pilot lights in accordance with the temperature of the water heated, and the pressure and flow of gas not only differs in different locations of such heaters but fluctuate through a considerable range in any location and, consequently, it is impossible to predetermine the rate of flow of gas to such a pilot light so that it shall be sufficient to prevent said light from being accidentally extinguished and not more than is needed for heating the water. Therefore, it has been found necessary to supply such a double burner, for an ordinary household gas water heater, with an average of fifty cubic feet of gas per hour; a large portion of which is wasted because the heat of its combustion is not entirely absorbed by the water and passes off with the products of combustion from the heater.

Therefore, I provide means to automatically control the flow of all of the gas consumed whenever the valve 31 is manually opened and the initial flow of gas ignited at the burner or burners. In the form shown, the water may be heated by the single burner 3 without using said pilot burner 4, and the flow of fuel gas to that single burner is controlled not only by the main valve 50 aforesaid but by an auxiliary valve controlling a bypass around the main valve; both the volume of gas through said main valve port and through the bypass being automatically variably determined by the same thermostatically operative means.

Therefore, as shown in Fig. III, I form a bypass conduit in said casing 33 by the drilled duct 59 communicating with the port 60 leading from the inlet to the outlet side of said partition 40 and through the seat 61 for the valve 64, by which the effective area of said bypass conduit is automatically varied, as hereinafter described. However, I provide the screw 65, which is accessible when said closure plug 45 is removed, whereby the effective area of said bypass duct 59 may be manually varied.

As indicated in Fig. III, said valve 64 is a disk having its upper annular rim extending in a plane parallel with said valve seat 61 and similar to the main valve 50 above described. Said valve 64 is normally upheld by the spiral spring 66 which is compressed between, and bears upon, both said valves 50 and 64. Of course, said spring 66 is of such strength as to uphold said valve 64 against the pressure of the gas from said inlet 48; but it is weaker than said main valve spring 55, so that it can not hold said valve 50 off its seat, under any circumstances. Said valve 64 encircles the tubular stem 68, of said valve 64, which is in coaxial relation with the stem 51 of said valve 50 and fitted on that stem so that it may be thrust into contact with said valve 50 to thrust it off its seat 41 when said thermostatic tube 38 contracts to the predetermined degree for the opening of said valve 50.

However, the axial position of said valve 64 on said stem 68 may be manually variably predetermined by the axial adjustment of the nut 70 which engages the screw thread 71 on said stem 68, but is split so as to fit tight enough to prevent its accidental displacement. Said valve 64 may be loose, or in screw threaded engagement with said screw thread 71 and said nut 70 be used to jam the same in adjusted position. Said valve 64 is so adjusted, axially on its stem 68, and with respect to said thermostatic carbon rod 57, that it is held off its seat 61 by said nut 70, to the extent desired to limit the flow of gas through said bypass 59; said valve stem 68 being part of manually adjustable means for imparting the thrust of said rod to said valves 50 and 64. Such adjustable means includes the cylindrical nut 72 which is mounted to reciprocate in said valve casing 33 but is prevented from turning therein by the set screw 73, shown in Fig. II which projects in the notch 74 in said casing 33. Said nut 72 is engaged with the rotary and axially adjustable screw stud 75, which has the smooth stem 76 extending into said plunger tube 68 as shown in Fig. III. Said screw 75 may be turned by its index arm 77, which projects radially therefrom and has its outer end overhanging the scale of graduations 78 on said casing 33 as indicated in Fig. II. Said set screw 73 may also be used to clamp said adjusting screw 75 in its adjusted position.

It is to be understood that the rotary adjustment of said screw 75 is effective to predetermine the precise degree of heat of the water 18 at which said valve 50 may be permitted to close under pressure of its spring 55 and, as above noted, that critical temperature is ordinarily 170° F. However, by retracting said screw 75 from said nut 71, more or less, said valve 50 may be thereby held off its seat 41 until the water 18 reaches a correspondingly higher temperature, and conversely, by shifting said screw 75 further into said nut 71; said main valve 50 may be permitted to be closed by its spring 55 at a lower temperature than 170° F. The range of that adjustment is indicated by the extent of said scale 78, to wit, about one-third of a revolution of said screw 75. However, it is to be understood that a greater range of adjustment may be attained by employing push plungers 68 of different lengths.

I find it preferable to so calibrate the automatically operative structure above described that if the main gas valve 50 is closed upon its seat 41; any further increment in the temperature of the water 18 surrounding the thermostatic couple elongates the copper tube 38 permitting said carbon rod 57 to be thrust farther into said tube 38, by the spring 66 of said valve 64; thus permitting said valve 64 to more closely approach its seat 61 and thus rapidly reduce the effective area of said bypass 59 and 60, with consequent reduction of the volume of gas supplied through the bypass to said burner 3 and thus prevent overheating the water and the waste of gas and danger to the apparatus which would be consequent upon such overheating.

Of course, the set screw 65 may be retracted to leave the full circular area of said drilled hole 59 unobstructed, or said screw may be inserted to restrict the effective area of the bypass, more or less, down to the minimum, but such manual adjustment of the effective area of said bypass is entirely independent of the automatic control thereof by the valve 64 and its appurtenances.

It is to be noted that whereas the ordinary thermostatically controlled gas water heater, for household use, consumes an average of fifty cubic feet of gas per hour, with considerable waste for the reasons above recited; I find it possible to operate a heater in accordance with my invention to supply substantially the same quantity of hot water as such ordinary heaters by the consumption of not more than twenty-five cubic feet of gas per hour, when the container 9 is provided with a suitable exterior jacket of heat insulating material. In such embodiment, the maximum area of the bypass conduit is such as to supply the burner 3 at the rate of ten cubic feet per hour, but the effective area of said bypass is variably limited as above described, so that when the main valve 50 is closed by the automatic operation of the device at the critical temperature of 170° F.; the water in the container may be maintained at that temperature by consumption of gas at the rate of approximately two cubic feet per hour, until the heated water is withdrawn, permitting cold water to enter the container 9; whereupon, both valves 50 and 64 are opened to permit the maximum flow of fuel gas to the burner 3 at the rate of twenty-five cubic feet per hour until the water in the container 9 is restored to the desired temperature. However, it is to be understood that I do not desire to restrict the use of my invention to such small gas consumption or to the temperature range above described, as the adjustable devices specified permit the operation of the heater to maintain the water 18 at any desired temperature.

Although I have shown a main valve 50 and an auxiliary valve 64 both in communication with a single gas inlet and a single gas outlet leading to a single burner; of course, the bypass conduit may lead to said pilot burner 4, distinct from said main burner 3. For instance, a pipe 80 leading to said burner 4 may be substituted for the screw 81 at the left hand side of Fig. III, to deliver gas from the duct 82 which is a drilled hole in said casing 33.

The construction and arrangement above described, of course, permit the consumer to vary the consumption of gas by movement of said index arm 77. However, under some circumstances, it is undesirable to permit the consumer to tamper with the valve controlling mechanism and, therefore, I have shown in Figs. V and VI, a simplified form of my invention, which differs from that shown in Figs. II and III in that said index arm and its appurtenances are omitted. Incidentally, such omission permits of a more compact arrangement of the valve structure by the omission of the bridge portion 83 of the casing 33 which frames said adjusting means in the form of my invention shown in Figs. II and III.

In the form of my invention shown in Figs. V and VI, the valve casing 85 has the inlet 86 and the outlet 87 respectively screw threaded for connection with the pipes 30 as indicated in Fig. I. The partition 89 in said valve casing 85, extends between said inlet and said outlet, and has the main port 90 surrounded by the annular, plane, main valve seat 91. The main valve 92 comprises a disk head fitted to said seat 91 and has axially opposite stems 94 and 95, the latter serving to engage the conically coiled spring 96 by which said main valve is continually pressed toward its seat aforesaid. Said stem 94 is in coaxial and telescopic relation with the tubular stem 97 of the auxiliary valve 98 which comprises a disk head having an annular plane face fitted to the annular auxiliary plane valve seat 99 surrounding the bypass port 100 which extends through said seat 99 and is connected with the inlet side of the valve casing by the bypass duct 101, which is a drilled hole forming with said port a bypass around said main valve 92, from the inlet to the outlet side of said valve casing 85. The effective area of said bypass duct 101 may be manually varied by the adjustable screw 102 which is accessible when the screw plug closure 103 of said valve casing 85 is removed. Said auxiliary valve 98 is continually urged toward its seat by the conical coiled spiral spring 105 which is interposed between said valves 92 and 98 encircling said stem 94 of the former.

Said valve casing 85 is provided with a single thermostat, such as above described, and including the copper tube 106 in screw threaded connection with said casing, surrounding the carbon rod plunger 108 which is mounted to reciprocate in said tube in coaxial relation with, and common to, both said valve stems 94 and 97. However, said tubular stem 97 of the auxiliary valve 98, is of such length that it normally holds that valve off its seat although if and when said copper tube 106 continues to expand after it reaches the degree of expansion which permits said carbon rod 108 to be thrust therein far enough to permit said main valve 92 to be closed upon its seat by its spring 96; said auxiliary valve is moved further toward its seat by the pressure of its spring 105 to thus vary the effective area of said auxiliary port 100.

Although the construction and arrangement of my invention shown in Figs. V and VI are such that no provision is made for adjustment of the action of the thermostat with reference to the two valves 92 and 98 which automatically controls them as above described; it is to be understood that the parts may be so proportioned that the water 18 is normally maintained at the critical temperature of 170° F., in the manner above described with reference to the form of my invention shown in Figs. I to IV inclusive, with said auxiliary valve 98 continually off its seat, more or less. However, it is to be understood that the construction and arrangement are such that said auxiliary valve would be closed upon its seat, to entirely shut off the gas supply from the burner 3, before the temperature of the water 18 in the container 9 reaches the boiling point and preferably at not more than 200° F.; so as to eliminate any possibility of disruption of the heater by generation of steam in said container 9.

However, it is to be understood that suitable means for manually adjustably varying the effect of the thermostat with reference to such valves as are indicated at 92 and 98, may be employed. That is to say, coaxially arranged valves, of the general construction and arrangement shown in Fig. VI, may be substituted for the valves 50 and 64 shown in Fig. III, in combination with the manually adjustable means including the screw 75 and the index arm 77 and their appurtenances.

It is characteristic of both forms of my invention above described that a single thermostat is arranged in cooperative relation with main and auxiliary valves which are of the disk type, disposed in parallel plane relation, and having respective stems which are in telescopic relation with each other and common to a single element of the thermostat which is thus adapted to operate both valves in the tandem relation shown and described.

Of course, the effective area of both of said valves 50 and 64, corresponding with a given axial movement thereof, is proportionate to the circumference of the respective valve adjacent its seat; the effective area being, of course, greater with a valve of large diameter than with a valve of smaller diameter. Therefore, it might be assumed that a single valve might be designed of sufficient diameter to admit the maximum flow of gas required and yet be adjustable to the minimum required. However, the axial movement is so slight that it is impossible to attain, with a single valve, the maximum flow desired and the accurate regulation required for the minimum flow. Therefore, it is essential to the attainment of the effect desired to employ at least two valves. Of course, two valves of the proper relative size might be operated by respectively distinct thermostatic devices. However, such construction and arrangement would not only double the cost of the thermostatic elements, but would fail to attain the precise coordination of operation of the two valves which is attained by the operation of both valves by the same thermostatic element. Therefore, it is characteristic of my invention that it includes not only two valves of respectively different capacities, but a single thermostatic element arranged to operate both such valves.

Moreover, although I have found it convenient to illustrate my thermostatically operative valve in conjunction with a water heater of a specific type; it is to be understood that I do not desire to limit myself to that embodiment, as it is obvious that such valves may be used for other purposes, and various modifications may be made therein without departing from the essential features of my invention, as defined in the appended claims.

I claim:

1. In a gas water heater; the combination with a water container; of a burner arranged to heat the water in said container; a main gas valve controlling a main fuel gas conduit leading to said burner; a bypass conduit leading to said burner, around said main valve; an auxiliary valve controlling said bypass conduit; a spring tending to close said main valve; a spring tending to close said auxiliary valve; a single thermostatic element, extending in said container, and in operative relation with both said valves, arranged to continually hold said auxiliary valve open, to a variable extent, and thereby vary the effective area of said bypass, in accordance with the temperature of the water in said container, and arranged to open said main valve at a predetermined temperature, and permit said main valve to be closed, at a predetermined temperature, by its spring; and means adjustable to variably determine the temperatures at which said valves shall be respectively operated in coordinated relation; whereby the heating effect of said burner is automatically determined and controlled to regulate the temperature of the water in said container and compensate for variations in such temperature, consequent upon withdrawal of hot water and influx of cold water with respect to said container.

2. In a gas water heater; the combination with a water container; of a burner arranged to heat the water in said container; a main gas valve controlling a main fuel gas conduit leading to said burners, a bypass conduit leading to said burner, around said main valve; an auxiliary valve controlling said bypass conduit; a spring tending to close said auxiliary valve; a single thermostatic element, extending in said container, and in operative relation with both said valves, arranged to continually hold said auxiliary valve open, to a variable extent, and thereby vary the effective area of said bypass, in accordance with the temperature of the water in said container, and arranged to open said main valve at a predetermined temperature, and permit said main valve to be closed, at a predetermined temperature, by its spring; whereby the heating effect of said burner is automatically determined and controlled to regulate the temperature of the water in said container and compensate for variations in such temperature, consequent upon withdrawal of hot water and influx of cold water with respect to said container.

3. In a gas water heater; the combination with a water container; of a burner arranged to heat the water in said container; a main gas valve disk controlling a main fuel gas conduit leading to said burner; a bypass conduit leading to said burner, around said main valve; an auxiliary valve disk, in coaxial relation with said main disk, controlling said bypass conduit; a thermostatic element, in operative relation with both of said valves, arranged to continually hold said auxiliary valve open, and thereby vary the effective area of said bypass, in accordance with the temperature of the water in said container, and arranged to open said main valve at a predetermined temperature, and permit said main valve to be closed at a predetermined temperature, and means adjustable to variably determine the temperatures at which said valves shall be respectively operated; whereby the heating effect of said burner is automatically determined and controlled to regulate the temperature of the water in said container and compensate for variations in such temperature, consequent upon withdrawal of hot water and influx of cold water with respect to said container.

4. In a gas water heater; the combination with a water container; of a burner arranged to heat the water in said container; a main gas valve disk controlling a main fuel gas conduit leading to said burner; a bypass conduit leading to said burner, around said main valve; an auxiliary valve disk, in coaxial relation with said main disk, controlling said bypass conduit; a thermostatic element, in operative relation with both said valves, arranged to continually hold said auxiliary valve open, and thereby vary the effective area of said bypass, in accordance with the temperature of the water in said container, and arranged to open said main valve at a predetermined temperature, and permit said main valve to be closed, at a predetermined temperature; whereby the heating effect of said burner is automatically determined and controlled to regulate the temperature of the water in said container and compensate for variations in such temperature, consequent upon withdrawal of hot water and influx of cold water with respect to said container.

5. In a gas water heater; the combination with a water container; of a burner arranged to heat the water in said container; a valve casing, having two valve seats in coaxial, parallel plane, relation; a main gas valve controlling a main fuel gas conduit leading to said burner and fitted to one of said seats; a bypass conduit leading to said burner, around said main valve and through the other valve seat; an auxiliary valve fitted to said other seat and controlling said bypass conduit; a spring tending to close said main valve; a spring tending to close auxiliary valve; a single thermostatic element, extending in said container, and in operative relation with both said valves, arranged to continually hold said auxiliary valve open, to a variable extent, and thereby vary the effective area of said bypass, in accordance with the temperature of the water in said container, and arranged to open said main valve at a predetermined temperature, and permit said main valve to be closed, at a predetermined temperature, by its spring; and means adjustable to variably determine the temperatures at which said valves shall be respectively operated in coordinated relation; whereby the heating effect of said burner is automatically determined and controlled to regulate the temperature of the water in said container and compensate for variations in such temperature, consequent upon withdrawal of hot water and influx of cold water with respect to said container.

6. In a gas water heater; the combination with a water container; of a burner arranged to heat the water in said container; a valve casing having two valve seats in coaxial, parallel plane, relation; a main gas valve controlling a main fuel gas conduit leading to said burner and through one of said seats; a bypass conduit leading to said burner around said main valve and through the other valve seat; means manually adjustable to vary the area of said bypass conduit; an auxiliary valve fitted to said other seat and controlling said bypass conduct; a spring tending to close said main valve; a spring tending to close said auxiliary valve; said valves being disks in coaxial relation, having respective stems in telescopic relation; a single thermostatic element, extending in said container and in cooperative relation with both said valves, arranged to normally hold said auxiliary valve open to a variable extent, and thereby vary the effective area of said bypass in accordance with the temperature of the water in said container, and arranged to open said main valve at a predetermined temperature, and permit said main valve to be closed at a predetermined temperature, by its spring; and means adjustable to variably determine the temperature at which said valves shall be respectively operated in coordinated relation; whereby the heating effect of said burner is automatically determined and controlled to regulate the temperature of the water in said container and compensate for variations in such temperature.

7. In a gas water heater; the combination with a water container; of a burner arranged to heat the water in said container; a valve casing having two valve seats in coaxial, parallel plane, relation; a main gas valve controlling a main fuel gas conduit leading to said burner and through one of said seats; a by-pass conduit leading to said burner around said main valve and through the other valve seat; means manually adjustable to vary the area of said bypass conduit; an auxiliary valve fitted to said other seat and controlling said bypass conduit; a spring tending to close said main valve; a spring tending to close said auxiliary valve; said valves being disks in coaxial relation, having respective stems in telescopic relation; a single thermostatic element, extending in said container and in cooperative relation with both said valves, arranged to normally hold said auxiliary valve open, to a variable extent, and thereby vary the effective area of said bypass in accordance with the temperature of the water in said container, and arranged to open said main valve at a predetermined temperature, and permit said main valve to be closed at a predetermined temperature, by its spring; whereby the heating effect of said burner is automatically determined and controlled to regulate the temperature of the water in said container and compensate for variations in such temperature.

8. The combination with a valve casing, having an inlet and outlet, a main port surrounded by an annular, plane, main valve seat and a bypass port surrounded by an annular, auxiliary, plane, valve seat; of a main valve comprising a disk head, fitted to said main valve seat, and an axial stem; an auxiliary valve comprising a disk head fitted to said auxiliary valve seat, and an axial stem; said valves being arranged for relative axial reciprocation with one valve stem sliding within the other; separate spiral springs, arranged to respectively urge said valves toward their seats; a thermostat having a single plunger element in coaxial relation with, and common to, both said valve stems, arranged to automatically open both of said valves, at certain temperatures, in opposition to said springs; whereby said main valve is permitted to close said main port at a certain temperature, while said auxiliary valve is normally held off its seat to an extent automatically variable in accordance with the temperature of said thermostat, and the effective area of said ports thus automatically controlled and varied; and manually adjustable means arranged to determine the effective area of said bypass.

9. The combination with a valve casing, having one inlet and outlet, a main port surrounded by a main valve seat; a bypass port surrounded by an auxiliary valve seat; a main valve comprising a disk head, fitted to said main valve seat, and an axial stem; an auxiliary valve comprising a disk head fitted to said auxiliary valve seat, and an axial stem; said valves being arranged for relative axial reciprocation with one valve stem sliding within the other; springs, arranged to respectively urge said valves toward their seats; and a thermostat having a single plunger element common to both said valve stems, arranged to automatically open both of said valves, at certain temperatures, in opposition to said springs; whereby said main valve is permitted to close said main port at a certain temperature, while said auxiliary valve is normally held off its seat to an extent automatically variable in accordance with the temperature of said thermostat, and the effective area of said ports thus automatically controlled and varied; and manually adjustable means arranged to determine the effective area of said bypass.

10. The combination with a valve casing, having an inlet and outlet, a main port surrounded by a main valve seat and a bypass port surrounded by an auxiliary valve seat; of a main valve comprising a disc head fitted to said main valve seat, and an axial stem; an auxiliary valve comprising a disc head, fitted to said auxiliary valve seat, and an axial stem; said valves being arranged for relative axial reciprocation with one valve stem sliding within the other; spring means arranged to urge said valves toward their seats; and one thermostat arranged to automatically open both of said valves, at certain temperatures; whereby said main valve is permitted to close said main port at a certain temperature, while said auxiliary valve is normally held off its seat to an extent automatically variable in accordance with the temperature of said thermostat, and the effective area of said ports thus automatically controlled and varied.

11. The combination with a water container; of a gas burner arranged to heat the water in said container; means arranged to control and regulate a supply of gas to said burner, including a valve casing having two valve seats in coaxial, parallel plane, relation respectively surrounding a main port and an auxiliary port; and a main valve and an auxiliary valve comprising respective disk heads in parallel plane relation, respectively opposed to said valve seats, and having stems in coaxial, telescopic relation; and a single thermostat, arranged to coordinately operate both of said valves, by means of said stems; and spring means arranged to urge each of said valves toward its seat; whereby said auxiliary valve is normally held off its seat, to an extent automatically variable in accordance with the temperature of said thermostat, after said main valve is closed upon its seat.

12. The combination with a valve casing having two valve seats in coaxial, parallel plane, relation respectively surrounding a main port and an auxiliary port; of a main valve and an auxiliary valve comprising respective disk heads in parallel plane relation, respectively opposed to said valve seats, and having stems in coaxial, telescopic relation; and a single thermostat, arranged to coordinately operate both of said valves, by means of said stems; and spring means arranged to urge each of said valves toward its seat; whereby said auxiliary valve is normally held off its seat, to an extent automatically variable in accordance with the temperature of the said thermostat, after said main valve is closed upon its seat.

13. The combination with a valve casing having a large main port and a smaller bypass port independently leading from an inlet to an outlet in said casing; of two valves respectively arranged to independently control said ports; closing means continually urging said valves to close said ports; and thermostatic means, common to both said valves, constructed and arranged to open both said valves, and permit them to be closed, by said closing means, independently of said thermostatic means, in accordance with changes in temperature.

14. The combination with a valve casing having two ports independently leading from an inlet to an outlet in said casing; of two valves respectively arranged to control said ports; closing means continually urging said valves to close said ports; and thermostatic means, common to both said valves, constructed and arranged to open both said valves, and permit them to be closed, by said closing means, independently of each other, in accordance with changes in temperature.

In testimony whereof, I have hereunto signed by name at Philadelphia, Pennsylvania, the nineteenth day of August, 1924.

ARTHUR E. PAIGE.

Witnesses:
CAROLINE E. REUTER,
HARRY A. MOSER.